United States Patent [19]

Putman et al.

[11] 4,311,253

[45] Jan. 19, 1982

[54] LOW LOSS STABILIZER

[75] Inventors: Thomas H. Putman, Penn Hills Township, Allegheny County; Donald G. Ramey, Churchill Borough, both of Pa.

[73] Assignee: Westinghouse Electric Corp., Pittsburgh, Pa.

[21] Appl. No.: 75,450

[22] Filed: Sep. 14, 1979

[51] Int. Cl.³ .............................................. H02H 7/06
[52] U.S. Cl. ....................................... 322/25; 322/58; 322/100; 322/29
[58] Field of Search ..................... 323/119; 322/20, 22, 322/25, 32, 58, 29

[56] References Cited

U.S. PATENT DOCUMENTS 4,080,559 3/1978 Wright et al. .......................... 322/25

Primary Examiner—J. D. Miller
Assistant Examiner—John W. Redman
Attorney, Agent, or Firm—M. J. Moran

[57] ABSTRACT

A dynamic stabilizer of the type which is utilized to compensate or stabilize the effect of subsynchronous resonance oscillations in a turbine generator system is taught. Silicon controlled rectifiers are connected in series with inductors between the lines of the electrical system. The silicon controlled rectifiers may be maintained at two quiescent conduction intervals of 90° and 135° depending upon the peak value of rotor oscillation. If the peak value of rotor oscillation is sufficiently small the lower conduction interval of 90° is utilized as this is sufficient to stabilize low level oscillations. Furthermore, it has great advantage in the fact that the losses represented by 90° quiescent conduction interval are relatively small when compared with the larger quiescent conduction interval. If on the other hand the generator speed peak oscillations become very large necessitating extended dynamic range for the stabilizer the quiescent conduction interval is changed automatically to 135°. This provides the needed dynamic range. A short time after the circuit has been stabilized in this region the circuit is automatically returned to a disposition in which the minimum conduction angle is utilized.

3 Claims, 3 Drawing Figures

LOW LOSS STABILIZER

CROSS-REFERENCE TO RELATED APPLICATIONS

The subject matter of this invention is related to copending application Ser. No. 48,934, filed June 15, 1979 and entitled "Dynamic Parallel Inductive Stabilizer for Synchronous Machines Having Torsional Oscillations". The inventors and assignee are the same as in the present invention.

BACKGROUND OF THE INVENTION

This invention relates generally to feedback control for turbine driven high power alternating current synchronous generator systems.

This invention relates more specifically to generator systems in which oscillations in the mechanical portion thereof due to subsynchronous resonance is a problem. Electrical generators are often driven from power sources such as steam turbines. Multiple rotating masses are usually present on a single shaft thereof. As an example, the rotating mass in one or more of the turbines, the rotating mass of the exciter for the AC generator and the rotating mass of the generator rotor may all be present. It has been found that because of the mechanical properties of the various parts of the rotating system, torsional oscillation will result involving the rotating masses. The torsional oscillation may result from disturbances internal to the generator or from disturbances external to the generator along the electrical system supplied thereby. If these torsional oscillations become large and undamped, they can cause shaft breakage. It has been found in certain applications that such undamped torsional oscillation may exist because of the electrical properties of the electrical system supplied by the AC synchronous generator. As an example, when long transmission lines are required for the delivery of energy to a grid network or load the inductive effect of the long transmission lines may require series capacitive compensation. However, the effect of the compensating capacitors being connected in series circuit relationship with the inductance tends to cause certain resonant frequencies to exist in the electrical network. The electrical effect of these resonant frequencies may be fed by the magnetic coupling between the stator and the rotor of the synchronous generator to the mechanically rotating shaft. If the previously described electrical resonance cooperates with a critical mechanical resonance between the masses of the generating system, reinforced, undamped torsional oscillation will occur which may be of a sufficient magnitude to break the shaft. Apparatus and method for solving this problem has been proposed in the past in U.S. Pat. No. 3,662,251, issued May 9, 1972 to O. J. M. Smith, entitled "Method and System for Measuring Acceleration and Velocity". This latter patent is related to the sensing of oscillations rather than providing a method for directly correcting for the effect of the oscillation. A similar measuring method and apparatus is described in U.S. Pat. No. 3,662,252, issued May 9, 1972 to O. J. M. Smith, entitled "Tachometer and Method of Attaining a Signal Indicative of Alternating Shaft Speed". Other U.S. patents propose apparatus for stabilizing low frequency power oscillation by measuring some parameter of a system and operating on the field excitation of the generator for corrective action. Examples of these patents are: U.S. Pat. No. 3,477,014, issued to A. L. Blyth on Nov. 4, 1969 and entitled "Electrical Control System with Stabilizing Control Means", U.S. Pat. No. 2,981,882, issued Apr. 25, 1961 to M. Rosenblatt, entitled "Stabilizing Circuit for Dynamoelectric Machines" and U.S. Pat. No. 3,656,048, issued Apr. 11, 1972 to A. W. Hauf, entitled "Non-Linear Exciter Controller for Power System Damping". Patents which are of interest for showing field control in electrical apparatus are: U.S. Pat No. 2,854,617, issued Sept. 30, 1958 to L. J. Johnson and entitled "Frequency Control Apparatus for Alternators" and U.S. Pat. No. 3,474,323, issued Oct. 21, 1969 to L. A. Kilgore et al, entitled "Electrical Control Systems with Stabilizing Control Means". Still other patents which may be of interest generally in this area are: U.S. Pat. No. 3,119,934, issued Jan. 28, 1964 to R. H. Lee, entitled "Generator Control Means" and U.S. Pat. No. 3,167,702, issued Jan. 26, 1965 to A. Schonung et al, entitled "Vibration Damping Arrangement for Rotary Field System of Excitation Regulation Synchronous Machines". Another patent which is related to frequency control by mechanical means is U.S. Pat. No. 2,767,367, issued Oct. 16, 1966, to L. Blank and entitled "Generator Frequency Control by Electrical Braking". All of the aforementioned patents are background patents for U.S. Pat. No. 3,999,115, issued Dec. 21, 1976 to South et al and entitled "Dynamic Stabilizer for Synchronous Machines Having Torsional Oscillations and Method". Although it is submitted that the latter patent represents a significant improvement in the state of the art for compensating for the effect of mechanical torsional oscillation as it is affected by electrical power line resonance where the compensation takes place in the electrical system per se, certain disadvantages lie in the fact that the compensating apparatus for the latter patent is essentially series connected in the transmission system of the compensator. Furthermore, the apparatus of the latter mentioned patent requires a frequency conversion. The frequency conversion is related to the frequency of the line resonance rather than the frequency of the torsional oscillation resonance. Finally, another disadvantage lies in the fact that in order to take the device out of service it must be short-circuited. The previously described cross-related application teaches a device which is essentially parallel connected rather than series connected. With the latter device thyristor switched inductors are connected between phase conductors of the AC system in the vicinity of the terminals of the turbine generator. Appropriate sensing and feedback control is provided between the electrical lines and the thyristor switched inductors to modulate the conduction angle of the thyristor switch about a relatively high bias conduction angle of approximately 135°. The modulation of the conduction angle produces the effect of modulating the inductance connected between the lines and it is this modulated inductance and the reactive current which is produced thereby which stabilizes the electromechanical generator system. The conduction angle of 135° is provided to give a dynamic range to the system for stabilizing the system. When the system is exposed to the effects of load disturbances the amount of power consumed in the stabilizer when the 135° quiescence conduction angle is utilized is easily justified. However, when there are no significant load disturbances the amount of standby power used at the 135° conductive angle tends to be relatively high compared with the power which is needed to stabilize the system from internal disturbances. It would be advantageous therefore if a stabilizer could be found which had the dynamic range to easily stabilize the electromechanical system from the effects of externally introduced disturbances and yet utilized relatively little power when the external disturbances were not present.

SUMMARY OF THE INVENTION

In accordance with the invention apparatus is taught in which a three-phase electrical generator of the type which is usually driven by a steam turbine generates a terminal voltage which has a synchronous 60 Hz frequency. A three-phase delta connected inductor network is interconnected with the three-phase lines for compensation and stabilization. Each delta leg comprises an inductor connected in series with a pair of oppositely disposed silicon controlled rectifiers. A rotor speed estimator is interconnected with the shaft of the turbine generator system to estimate the rotor torsional velocity deviation from synchronous speed and to provide an output signal related thereto. If the output signal is above a certain predetermined value, a biasing circuit which is fed thereby produces at its output a relatively high biasing signal. This biasing signal is provided to the thyristors for maintaining a quiescent conduction angle thereof at approximately 135°. This allows for a dynamic range of sufficient magnitude to stabilize the electromechanical system when under the effect of load disturbance of a relatively high magnitude. On the other hand, if the rotor speed signal is below the aforementioned predetermined value, the biasing signal is of a significantly smaller value so that the quiescent conduction angle of the thyristors is maintained at approximately 90°. This provides a reduced dynamic range. The latter dynamic range is envisioned to be sufficient to compensate for small scale internal disturbances to the turbine generator system. By maintaining the quiescent conduction angle at 90° rather than 135° a standby power savings of approximately 6 to 1 can be obtained.

BRIEF DESCRIPTION OF THE DRAWINGS

For a better understanding of the invention reference may be had to the preferred embodiment thereof shown in the accompanying drawings in which.

DESCRIPTION OF THE PREFERRED EMBODIMENT

Figure 3:
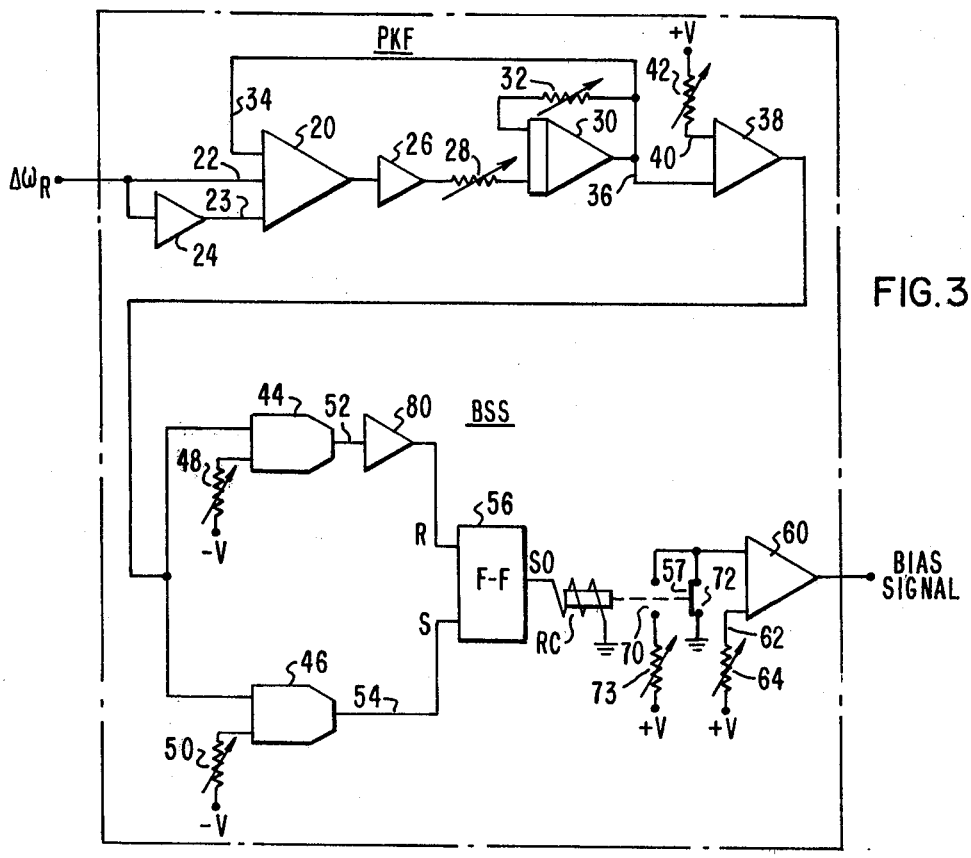
FIG. 3 shows an expanded view of the bias signal supply portion of the apparatus of FIG. 2.
Figure 2:
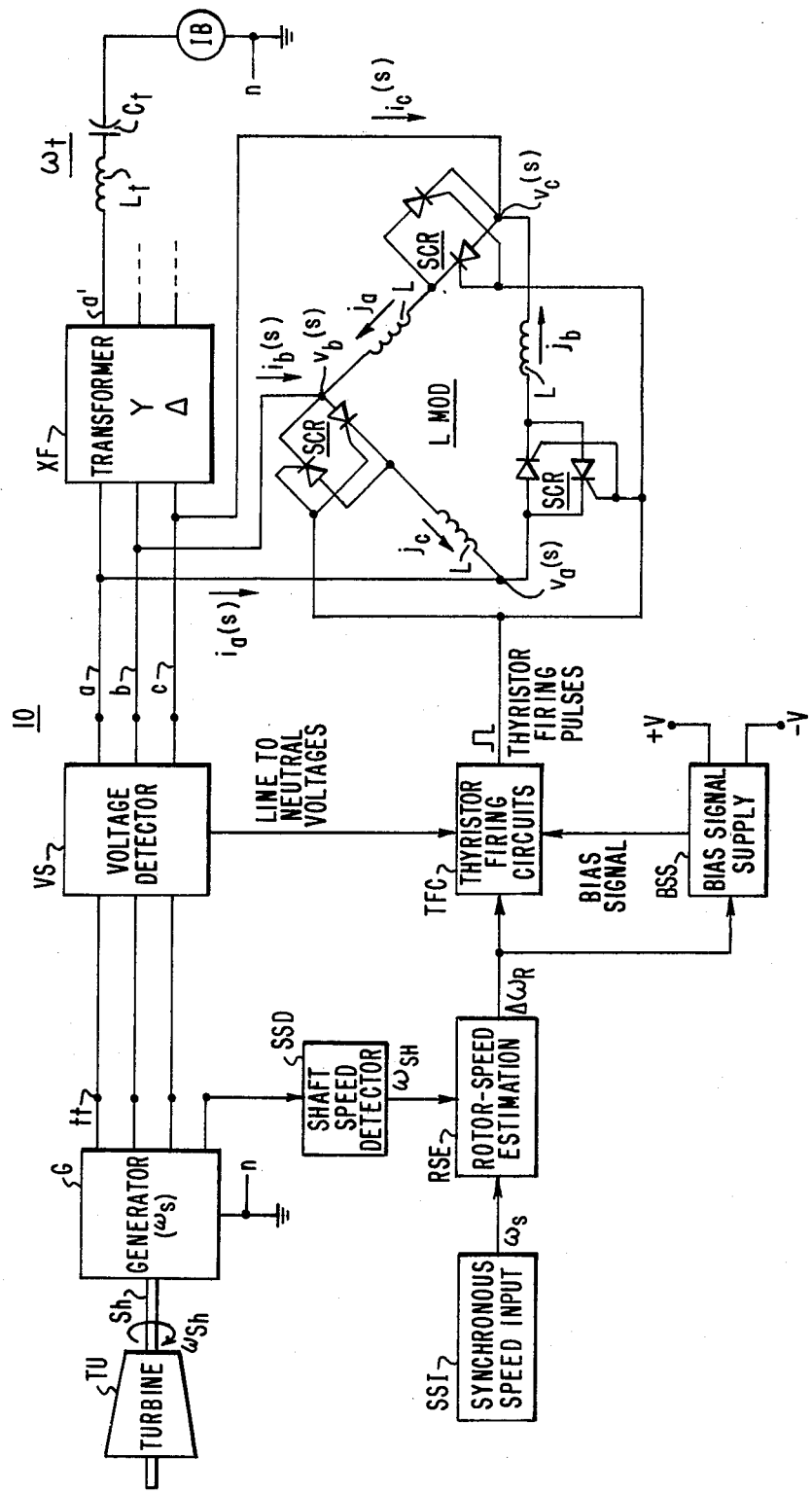
FIG. 2 shows a schematic diagram of a turbine generator system with associated load and dynamic stabilizer.

Referring now to the drawings and FIGS. 2 and 3 in particular, the preferred embodiment of the present invention is shown. FIG. 2 represents a circuit very similar to that shown and described with respect to the previously described copending application Ser. No. 48,943. For purposes of simplicity of illustration the description and operation of that circuit will be described briefly herein.

The system comprises an AC generator G which is driven by a turbine unit TU which is interconnected to the generator G by way of a common shaft Sh. The nominal electrical frequency is $\omega_s$. Ideally, the generator shaft Sh turns at a speed sufficient to generate this frequency in an unvarying sense. In actuality however, since the mechanical system associated with the generator G and the turbine TU includes damping, resilience, etc., the shaft may have a tendency to oscillate at some relatively low mechanical resonant frequency. The mechanical or torsional oscillation modulates the electrical frequency $\omega_s$ to provide three frequency components at the output terminals tt of the generator G. There is present a major voltage component at the frequency $\omega_s$ and minor or lesser side band voltage components at frequency $\omega_s$ minus the torsional oscillation frequency and at the frequency $\omega_s$ plus the torsional oscillation frequency. Interconnected with the three terminals is a voltage detector VS, the use of which will be described hereinafter. Interconnected with the voltage detector are the three phase AC lines a, b and c which are interconnected with the input winding of a wye-to-delta (Y-Δ) connected transformer XF. Connected to the output winding of the transformer XF are three lines, only one of which, a', is shown. For purposes of simplicity of illustration, there is further shown a line inductance $L_l$ and a line capacitance $C_l$. The line a' is shown interconnected with an infinite bus IB which in turn is returned to the generator by way of a neutral or ground n. If the line a' is extremely long, the line inductance $L_l$ becomes very large thus requiring series capacitive compensation. The series capacitors $C_l$ are often supplied by the generator manufacturer. The relatively large capacitance $C_l$ and the relatively large inductance $L_l$ connected in series cooperate to provide a resonant frequency $\omega_l$ which may be in the subsynchronous range of the voltage generator G. That is to say, the resonant frequency $\omega_l$ may be less than 60 Hz. Unfortunately, the mechanical or torsional oscillation characteristic of the mechanical system for the generator G is also often in the subsynchronous range and it is not unlikely that the resonant frequency of the electrical circuit $\omega_l$ may be equal to $\omega_s$ minus the resonant frequency $\omega_m$ of the mechanical system. If this happens, the subsynchronous side band or low frequency side band of the modulated generator output voltage may cause an extremely high current to flow in the electrical system. This current in turn may feed back magnetically through the air gap of the generator to further excite the torsional oscillation of the mechanical portion of the generator. This effect tends to boot strap, thus eventually causing mechanical damage such as shaft breakage in the generator system. To provide compensation for this, an inductive modulator L MOD is provided. The inductive modulator comprises three delta connected branches. Each branch of the delta connected network comprises an inductor L and a pair of oppositely-disposed, parallel-connected, silicon controlled rectifiers SCR. The gates of the silicon controlled rectifiers SCR may be actuated to allow current to flow through each of the inductors L. There is provided a rotor speed estimator RES which is connected at one input thereof to an exciter shaft speed detector SSD which in turn is interconnected in some convenient manner with the generator system for measuring or detecting shaft speed $\omega_{sH}$. An example of this is a shaft mounted tooth wheel between the rotor and the exciter. There is also provided a synchronous speed input device SSI which is interconnected to another input of the rotor speed estimator RSE for providing an indication of the underlying or basic synchronous speed $\omega_s$ of the shaft. The shaft speed $\omega_{sH}$ and the synchronous speed $\omega_s$ are operated upon by the rotor speed estimator RSE to provide an output signal $\Delta\omega_R$ which is equal to the variation of the rotor speed relative to the speed corresponding to synchronous frequency. This is accomplished by measuring the shaft speed $\omega_{SH}$ and estimating the change in generator rotor speed $\Delta\omega_R$ as a function thereof. The output signal from the rotor speed estimator is the signal $\Delta\omega_R$ which represents a change in the generator rotor speed. The frequency of the change in the rotor speed is, of course, the torsional oscillation frequency, and it is this $\Delta\omega_R$ or change in rotor speed signal which causes the oscillation in the voltage at the terminals tt. This modulating signal is provided to the thyristor firing circuit TFC. This modulating signal is also provided to a bias signal supply BSS and operates to control the bias signal supply in a manner which will be described henceforth. The thyristor firing circuit TFC operates in conjunction with the bias signal supply BSS and the line-to-neutral voltage input from the voltage detector VS to provide thyristor firing pulses at firing angles which are related to the change in generator rotor speed which in turn of course is related to the torsional oscillation. Since the thyristor firing pulses are provided to the silicon controlled rectifiers SCR of the inductive modulator L MOD, the effect is to modulate the currents in the inductive modulator L MOD by the change in generator rotor speed $\Delta\omega_R$ which represents the subsynchronous torsional oscillation frequency. The voltages at each node corner of the delta connected inductive modulator L MOD are $v_a^{(s)}$, $v_b^{(s)}$ and $v_c^{(s)}$. The currents between each of these nodes and the lines a, b and c are $i_a^{(s)}$, $i_b^{(s)}$, and $i_c^{(s)}$, respectively. These currents divide up into inductor currents, $j_a$, $j_b$, and $j_c$. Current $j_a$ flows between the voltage node represented by the voltages $v_c^{(s)}$ and $v_b^{(s)}$. In a like manner, the current $j_b$ flows between the nodes represented by the voltages $v_a^{(s)}$, $v_c^{(s)}$, and finally the inductor current $j_c$ flows between the nodes represented by the voltages $v_b^{(s)}$ and $v_a^{(s)}$. The voltages $v_a^{(s)}$, $v_b^{(s)}$, and $v_c^{(s)}$ can be thought of as being equal only to the center frequency voltage between the appropriate output terminals tt of the generator G. In other words, the relatively small side band voltages are ignored. It is the latter center frequency voltage which cooperates with the inductive elements L MOD to create the previously described inductive currents $j_a$, $j_b$, and $j_c$. These latter currents therefore are relatively independent of the side band voltages produced at the generator terminals tt. However, these currents are modulated by switching on and off the silicon controlled rectifier SCR in a time sequence which is related to the torsional oscillation frequency. This has the effect of modulating the inductance L by the torsional oscillation frequency, thus causing the currents $j_a$, $j_b$, $j_c$ to have three components, one of which is a majority or midband component at the carrier frequency $\omega_s$ of the voltage at the terminals tt of the generator G. However, the modulation effect produces side band currents which have frequencies equal to the carrier frequency $\omega_s$ minus the modulation frequency and the carrier frequency plus the modulation frequency. However, since the modulation frequency is essentially the frequency of the torsional oscillations, the side band currents have frequencies equal to the carrier frequency $\omega_s$ minus the torsional oscillation frequency and the carrier frequency $\omega_s$ plus the torsional oscillation frequency. It will be recalled, however, that the lower sideband current is at a frequency which is equal to the resonant frequency $\omega_t$ of the electrical system. Consequently, this very small current will excite a relatively large current in the line due to the resonance characteristics of the line. Fortunately, the phase of this current is in opposition to the phase of the current coming from the generator and thus has a tendency to reduce or cancel the generator current at that frequency. Since this latter lower side band current is cancelled, the previously described boot strapping effect associated with increasing torsional oscillation is reduced or eliminated.

In regard to the preceding, the preferred embodiment of the invention as shown generally requires knowledge of the actual speed of the generator rotor to determine the firing angles of the thyristors SCR associated with the L-type modulator. Unfortunately, in most turbine-generators, the change in generator rotor speed, $\Delta\omega_R$, cannot easily be measured. On the other hand, a measurement of the speed $\omega_{SH}$ between the generator rotor and exciter is usually available. Consequently, the function of the rotor speed estimator RSE is to estimate the change in the actual generator rotor speed $\Delta\omega_R$ given the shaft speed $\omega_{SH}$. Any circuit which performs this function may be utilized. If, on the other hand, actual knowledge of the rotor speed is available, then the rotor speed estimator may be replaced by a rotor speed detecting device. For purposes of simplicity, the incremental generator rotor speed $\Delta\omega_R$ may be related to the generator rotor speed $\omega_R$ minus the synchronous speed $\omega_s$. The synchronous speed $\omega_s$ is subtracted out so that in subsequent amplification and signal processing, a large average value does not have to be contended with. All of the oscillating modes of the rotor system are exhibited by the $\Delta\omega_R$ signal. The conduction angles of the thyristor are related to the incremental speed signal $\Delta\omega_R$ such than an increase in $\Delta\omega_R$ reduces the conduction angle and a decrease in $\Delta\omega_R$ increases the conduction angle. The actual thyristor firing circuits may take several forms, but whatever form is used, the required inputs in addition to the $\Delta\omega_R$ signal include the line-to-neutral voltages or the line-to-line voltages as the case may be and a bias signal. Such apparatus is disclosed and described in U.S. Pat. No. 3,999,117 entitled "Method And Control Apparatus For Static VAR Generator And Compensator" issued Dec. 21, 1976 to L. Gyugyi et al. The bias signal sets the quiescent operating point of the L-type modulator L MOD by setting the thyristor conduction angle at about 125° to 135°, for example, when $\Delta\omega_R$ is zero. The latter bias signal is desirous when it is expected that torsional oscillation will be caused by disturbances in the lines served by the transformer XF, for example. If on the other hand, however, the only expected source of subsynchronous oscillation is from disturbances within the turbine generator unit, then the conduction angle should be set at approximately 90° as that angle is sufficient to provide dynamic range for stabilizing the kinds of oscillations which are generated by internal disturbances. The signal $\Delta\omega_R$ is supplied to the bias and signal supply in a manner which will be described hereinafter so that the amount of rotor speed oscillation may be utilized to determine which of the two quiescent conduction angles, i.e., approximately 135° or approximately 90° are to be utilized. Pulses from the thyristor firing circuits fire the thyristors SCR which are associated with the L-type modulator L MOD. The function of the L-type modulator is to modulate the apparent inductance which is connected to the terminals tt of the generator G. This is done by changing the conduction angles of the thyristors SCR which control the currents $j_a$, $j_b$ and $j_c$ which flow through each inductor L. Because the current which passes through the inductor L is high in harmonic content, particularly the third, the reactors or inductors L are connected in delta circuit configuration in the preferred embodiment of the invention. Thhis prevents the third harmonic of current as well as certain higher harmonics from flowing in the lines a, b and c which feed the modulator L MOD. Consequently, the currents $i_a{}^{(s)}$, $i_b{}^{(s)}$, and $i_c{}^{(s)}$ shown in the Figure are reasonable approximations of sine waves. In the preferred embodiment of the invention, the modulator is connected to lines a, b and c close to the terminals tt of the generator G. The voltage detector VS is not considered as part of the load. The stabilizing circuit not only makes the system dynamically stable, but also quickly attenuates any subsynchronous resonance oscillation made which is excited by electrical system disturbances. However, the generator terminals tt are not necessarily the optimum location for the stabilizer or compensator. The output terminals of the generator transformer XF may be more suitable in some embodiments of the invention as connection there tends to reduce the volt ampere rating of the stabilizer. This is because there is more inductive reactance between the stabilizer and the generator G. As a result of this, the amplification of the lower side band (subsyncrhonous) frequency current in the generator would be higher. This enhances the stabilizers capability of exciting a counter subsynchronous resonance current in the stator circuit of generator G.

It should be remembered that the mechanical system comprising the mass-elastic system of the turbogenerator unit represented by the turbine TU and the generator G exhibits certain normal modes, most of which result in some oscillatory motion of the generator rotor. In addition, the electrical system has a principal oscillatory mode which is determined by the series capacitance $C_t$, transmission line inductance $L_t$, and the subtransient reactance of the generator G. The mechanical and electrical modes are non-interreactive to the extent that their frequencies are virtually independent. That is, a change in an electrical parameter will not significantly change the frequency of the mechanical mode and vice versa. However, if the electrical mode frequency corresponds to the synchronous frequency, for instance, 60 Hz, minus the frequency of a mechanical mode, then a coupling takes place which manifests itself as negative damping for both the electrical mode and the mechanical mode. As a result of this coupling, the amplitude of the oscillatory modes grows in time.

It should be kept in mind that when the machine rotor oscillates at one of its normal modes, a type of modulation of the terminal voltage of the machine occurs. Although this modulation is neither amplitude nor phase modulation in the classical sense, the effect of the modulation at the generator terminals tt is a voltage with components at the carrier frequency $\omega_s$, a lower side band frequency and an upper side band frequency, as mentioned previously. The side band frequencies differ from the carrier frequency $\omega_s$ by the mechanical oscillation frequency. The carrier frequency is the normal power system frequency of 60 Hz in most cases. In addition, the side band voltages are balanced polyphase voltages with 120° relative phase angle at the side band frequency. Of course, the side band frequencies cannot exist without corresponding side band currents which will also be balanced polyphase currents. Because the impedance of the system is frequency dependent, the current at the upper side band frequency will be much different than that of the lower side band frequency. When subsynchronous oscillation occurs, the stator circuit is in resonance at the lower side band frequency Sb and a very large lower side band current eventually builds up. It is this current which gives rise to a negative damping torque. It should be realized that the lower sideband current takes many cycles to build up because of sharply tuned resonance, but the build-up is inexorable. If the lower side band current caused by the rotor oscillation results in negative damping, a lower side band current with exactly the opposite phase would produce positive damping. The purpose of the L-type modulator L MOD of the active stabilizer is to generate lower side band polyphase currents which are 180° out of phase from those generated by the rotor oscillations. The stabilizer therefore, is a lower side band current generator.

With respect to the preferred embodiment of the invention, computer simulation has led to the determination of pertinent parameters for one specific 410 MVA generator with a line-to-line voltage equal to 22 KV which are listed below:

Inductance L=25.7 mh

Quiescent Line Current (Fundamental)
IL=2333 amps, peak=1653 amps, rms

Quiescent Phase Current (Fundamental)
IP=1345 amp, peak=950 amps, rms

Quiescent Reactive Power at 22 KV,
$Q=62.7\times 10^6$ volt-amp for three phases Quiescent Conductive Angle of Thyristors SCR
$\theta_c=125°$ The Full Load Current of the Machine
IF=10,760 amps, rms (approximate)

Full Load Current Requirement of the Stabilizer in Percentage of Full Load Current of the Machine=15.4%.

The power loss of the stabilizer L MOD is determined by the resistance of the controlled reactors. If the thyristors SCR are conducting for full 180° of the voltage half cycle then the loss in each of the three reactors L would be as follows:

$$P=I^2R=(I^2X/Q)=(VI/Q) \qquad (1)$$

where
P=watts, average power loss
I=amps, rms current when thyristor is fully conducting
X=ohms, reactance of inductance at the carrier frequency
V=volts, rms voltage across reactor and associated thyristor
Q=X/R, the reactor quality factor Thus the maximum loss is simply the maximum volt amperes divided by the reactor Q. There are practical limits on the reactor Q so that one can expect a Q value of somewhere between 100 and 200. Consequently, the losses of the reactors L when fully on may be between ½% and 1% of their volt ampere rating. Fortunately the thyristors SCR do not conduct for a full 180° of voltage cycle so that the average power loss is always less than that given by Equation 1. As was mentioned previously, the thyristors SCR have a so-called quiescent conduction angle which is roughly 135°. When a stabilizing action is occurring the conduction angle varies about the quiescent angle. After a subsynchronous resonance oscillation is attenuated, the conduction angle no longer varies relative to the quiescent value. Because the occurrence of subsynchronous resonance oscillation is rather infrequent, the average power loss of the reactors will be considered to be the loss at the quiescent conduction angle.

Obviously the loss which occurs depends upon the quiescent conduction angle. If the angle is zero, the loss would be zero. On the other hand, a conduction angle of 180° leads to the loss calculated by Equation 1. It is possible to calculate the loss for any conduction angle relative to the loss at 180° conduction. We shall call this the relative loss and represent it by the symbol $P_r$ (r for relative). The equation for the relative loss is $$P_r = (1/\pi)(\theta_c(2 + \cos\theta_c) - 3\sin\theta_c) \qquad (2)$$

where $\theta_c$ = radians, thyristor conduction angle
$P_r$ = ratio of loss at angle $\theta_c$ to that which occurs when $\theta_c = 180°$.

Figure 1:
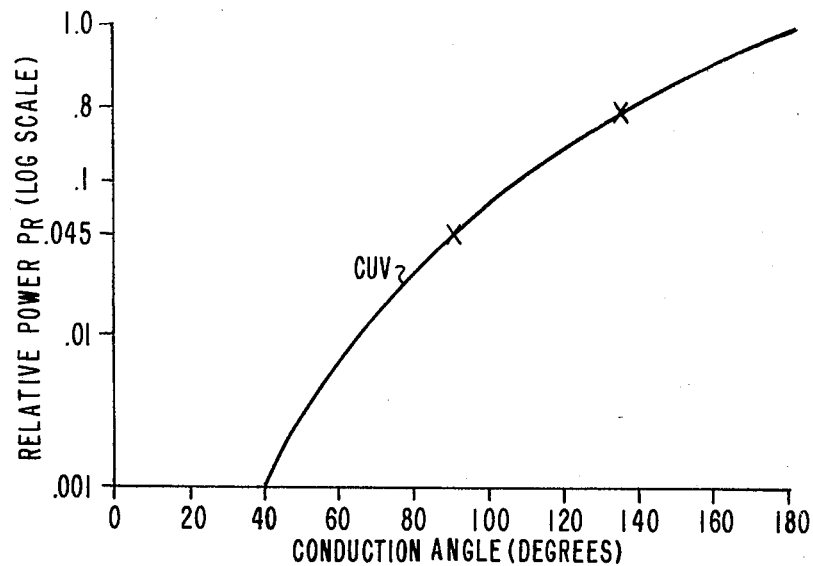
FIG. 1 shows a plot of relative power versus conduction angle for a thyristor controlled inductor.

By inspection of Equation 2 one can easily see that when $\theta_c = 180°$, the value of $P_r$ is 1; and when $\theta_c = 0$, the value of $P_r$ is zero. The values in between these obvious points must be determined by calculation as shown in FIG. 1. As can be seen from the figure the loss varies very rapidly with the firing angle. For example, the loss varies by about six to one when the firing angle goes from 90° to 135°. This suggests that if one could reduce the quiescent firing angle significant loss reduction will result.

It can thus be seen that the bias signal supply provides two levels of bias to the thyristor firing circuit TFC. The bias signals are determined as a function of the signal $\Delta\omega_R$ provided by the rotor speed estimator. If the rotor speed estimator indicates that the amount of torsional oscillation as indicated by the speed $\Delta\omega_R$ is relatively low or non-existent, then the bias signal supply BSS will provide a biasing signal of sufficient magnitude to keep the silicon controlled rectifiers SCR in the modulator L MOD at about 90°. If on the other hand, the oscillations due to the subsynchronous resonance exceed a predetermined value of, for example, 0.2% of the synchronous speed, then the bias signal supply BSS will be alerted by the increase in the signal $\Delta\omega_R$ to provide information to the thyristor firing circuit TFC which causes the thyristors SCR to conduct for approximately 135° thus increasing the dynamic range of the stabilizer L MOD. With the increased dynamic range greater variation in the modulation can take place thus providing greater capability for stabilization.

In order to accomplish the foregoing, reference should be made to FIG. 3 in addition to FIG. 2. FIG. 3 shows a circuit diagram of details of a preferred embodiment of a biased signal supply module BSS such as shown in FIG. 2. With regard to FIG. 3 there is shown on the left a first inverting three input summer 20. The first input 22 is interconnected to receive the $\Delta\omega_R$ signal from the rotor speed estimator. The second input 23 is connected to receive an inverted $\Delta\omega_R$ signal. The inversion takes place by way of the inverter 24. Furthermore, inverter 24 is provided with a gain of two such that the signal on 23 will always be twice as large as the signal on 22. Furthermore, the inverter 24 is characterized as being positive limited so that only a positive output signal will appear, negative output signals being clamped at zero. The net effect of the inputs 22 and 23 is to always provide a positive input to the summing amplifier 20 when taking the terminals 22 and 23 in conjunction. For example, if the signal $\Delta\omega_R$ is positive to begin with, then the entire signal will appear on line 22 and no signal will appear on line 23 because the inverter output on inverter 24 would have to be negative which cannot happen with a positive limiting amplifier. On the other hand, if the signal $\Delta\omega_R$ is negative, it will appear on line 22 but double that value positive will appear on line 23. The sum of the two is a positive value which is equal to the signal $\Delta\omega_R$. Consequently, it can be seen that the lines 22 and 23 cooperate with the inverter 24 and the input signal $\Delta\omega_R$ to drive amplifier 20 with the absolute value of $\Delta\omega_R$ (i.e. $|\Delta\omega_R|$). Suppose $\Delta\omega_R$ does not change with time. Ignoring the effects of line 34 for the present time, the output of the summing amplifier 20 provides an input to positive limiting inverter 26. It will be noted that the output of the summing amplifier 20 can never be positive unless the signal on the line 34 is negative and exceeds the net positive input on lines 22 and 28. Consequently, the input to the positive limiting amplifier 26 shown to the right of amplifier 20 is always negative unless the signal 34 is sufficiently negative. Regardless, because of the nature of the positive limiting inverter 26 the output thereof can never be negative. The latter signal is fed through a potentiometer 28 the use of which will be described hereinafter. The other end of potentiometer 28 is supplied as one input terminal to integrator 30. Neglecting the influence of potentiometer 32 for the time being, the effect of the integrator 30 is to provide an integrated negative analog of the signal of its last mentioned input. This signal is fed back to the input 34 of the inverting summing amplifier 20. As the value on the output 36 of the integrator 30 becomes increasingly more negative, the signal on the line 34 becomes increasingly more negative until it equals the sum of the signals on the lines 22 and 23 in which case the output of the amplifier 20 will go to zero and the output of the amplifier 26 will go to zero. Consequently, the input to the integrator 30 at this time is zero and the output will equal the sum of $-|\Delta\omega_R|$.

If now we consider $|\Delta\omega_R|$ to be increasing with time, the output of integrator 30 will follow this increase with an accuracy of which is determined by potentiometer 28. If $|\Delta\omega_R|$ decreases, the output of integrator 30 will not follow this for the following reasons.

When $|\Delta\omega_R|$ is reduced, then the output of integrator 30, which is normally $-|\Delta\omega_R|$, would have to become less negative if amplifier 20 is to follow the signal $|\Delta\omega_R|$. This can only happen if a net negative signal is applied to integrator 30. Amplifier 26 is positive limited so it cannot contribute any negative signal. If potentiometer 32 is set at zero, then integrator 30 has no way by which it can respond to a decrease in $|\Delta\omega_R|$ and it will hold the most recent peak value of $|\Delta\omega_R|$. In actuality, potentiometer 32 is adjusted so that the output of integrator 30 decays very slowly toward zero when the output of amplifier 26 is zero. If $|\Delta\omega_R|$ is held fixed, the output of integrator 30 will ultimately equal $-|\Delta\omega_R|$ the new lower value of $|\Delta\omega_R|$.

The overall result of the circuit is that the output of integrator 30 responds very quickly to relative increases in $|\Delta\omega_R|$ but very slowly to relative decreases in $|\Delta\omega_R|$.

The time constant potentiometer 28 is to provide a filtering effect for the peak follower PKF described previously. This means that signals in the noise range, even though having relatively high peak values, will not be stored at the output 36 as the entire peak follower is band limited to a value lower than the noise range by the setting of the potentiometer 28. The peak following signal on the line 36 is provided to one input terminal of an inverting summing amplifier 38. It is recognized that the need may arise to adjust the bias signal supply so that steady state DC errors, integrator drifts or the like may be tuned out so that the actual output signal from the summer 38 is a more accurate representation of the peak value of the torsional oscillation. In order to do this the terminal 40 of the summer 38 is connected by way of a potentiometer 42 to a plus voltage supply. The potentiometer 42 is adjusted under known conditions of non-oscillation so that the output of the summer 38 is zero. This means that when an oscillation condition exists which provides an output for the summer 38 it can be assured that this output is an accurate representation of the actual amount of the peak of the oscillation. Connected to the output of the comparator 38 are one terminal each of a pair of comparators 44 and 46. Connected to the other terminal of the comparator 44 is a potentiometer 48, the other side of which is connected to a source of negative voltage $-V$. Connected to the other terminal of the comparator 46 is a potentiometer 50, the other side of which is also connected to the voltage source $-V$. Connected to the output 52 of the comparator 44 is logic inverter 80 which provides a signal to the reset input R of a flip-flop or register 56. Connected to the output terminal 54 of the comparator 46 is the set terminal S of the flip-flop or register 56. The set output SO of the register 56 is connected to one side of relay coil RC, the other side of which is connected to ground or system common. It is presumed for purposes of simplicity of illustration that the flip-flop or register 56 provides sufficient power at its output terminal SO to energize the relay coil RC. The movable contact 57 of the relay coil RC is connected to one input of an operational amplifier 60. The output of the operational amplifier 60 is for purposes of simplicity of illustration to be considered the location from which the bias signal shown in FIG. 2 emanates. Connected to the other input terminal 62 of the operational amplifier 60 is a potentiometer 64, the other side of which is connected to a positive voltage supply $+V$. The wiper 57 of the relay contacts for the relay coil RC may be connected to a point 70 or to a point 72. Point 70 is connected to a positive source of voltage $+V$ through a potentiometer 73. The potentiometer 48 of the previously described comparator 44 may be so adjusted that the output signal present on summing inverter 38 must exceed a certain value before the output 52 of the comparator 44 switches from a zero state to a digital one state. In the preferred embodiment of the invention this value is 0.05% of the expected non-disturbed steady state synchronous speed for the AC system shown in FIG. 2. In a like manner the potentiometer 50 may be so adjusted that the comparator 46 will provide a digital one at its output 54 when the signal on the output of the summing inverter 38 exceeds a second predetermined value which may in this embodiment of the invention be 0.2% of the latter mentioned steady state synchronous speed signal.

OPERATION OF THE BIAS SIGNAL SUPPLY

When the voltage signal $\Delta\omega_R$ is present, that is when there is some value of torsional oscillation, the highest recent peak value thereof is provided as a detained DC value at the output of the summing amplifier 38. As this DC value exceeds the value on the input served by potentiometer 48 of the comparator 44, the output terminal 52 thereof will go to a digital one. This signal will be inverted by the amplifier 80, thus putting a digital zero on the reset terminal R of the flip-flop 56. A digital zero will not inhibit flip-flop 56 from changing state if a set signal should occur. As the peak value of the $\Delta\omega_R$ signal increases, indicating a higher amplitude of torsional oscillation, the voltage at the terminal served by the potentiometer 50 of the comparator 46 will also be exceeded on the other input terminal thereof, thus producing a digital one on the line 54. This change from the state of digital zero to digital one on the line 54 will positively trigger the set terminal S of the flip-flop 56, thus providing relay coil drive for the relay coil RC at the terminal SO of the flip-flop 56. Prior to the relay coil RC being energized the wiper 57 of the relay coil RC is disposed in the normal position shown in FIG. 3 in which the associated input for the operational amplifier 60 is grounded. Consequently, the entire voltage signal for the operational amplifier 60 is provided by the line 62. This is calibrated to provide a bias output signal which will actuate the thyristor firing circuit TFC to provide thyristor firing pulses of sufficient magnitude to maintain the conduction angle of the silicon controlled rectifiers SCR at approximately 90° for reasons described previously. If, however, the $\Delta\omega_R$ signal has exceeded the value of 0.2% as described previously and the relay coil RC has been actuated as described previously, the wiper will change dispositions from terminal 72 to terminal 70. This will supply an additional increment of voltage to the operational amplifier 60. This additional incremental of voltage will produce a larger bias signal than was previously the case by an amount of approximately 45° so that the total bias signal is now approximately 135° for reasons described previously. This signal will then cooperate with the thyristor firing circuit to thusly provide thyristor firing pulses which will increase the conduction interval of the silicon controlled rectifiers from 90° to 135°. Consequently, it can be seen that the operation of the bias signal supply is such that two quiescent conduction angles or intervals can be obtained for the silicon controlled rectifiers. The lower quiescent conduction intervals at approximately 90° and the higher conduction interval is at approximately 135°. After the highest peak value of $\Delta\omega_R$ has occured, the adjustment accorded to the potentiometer 32 will cause the voltage signals at the common input terminals for the comparators 44 and 46 to drift downwardly towards the new value of $\Delta\omega_R$. The comparator 46 will change state first as the voltage drifts downward so that the signal on the line 54 goes from a digital zero to a digital one. This signal will not cause the flip-flop 56 to change state. However, as the voltage signal at the output of the amplifier 38 drifts to an even lower value, the output 52 of the comparator 44 will eventually change state from digital one to digital zero causing the output of the inverting amplifier to change state from a digital zero to a digital one. This will positively trigger the reset terminal R of the flip-flop 56, thus removing the relay drive from terminal SO for the relay coil RC. This will then cause wiper 57 to return to its normal position in which it is interconnected with grounded terminal 72, thus reducing the bias supply to a value which will cause the conduction interval of the silicon controlled rectifiers to be approximately 90° once again. It will be noted that a hysteresis effect is provided between the comparators 44 and 46 so that the relay coil is energized at a relatively high peak value of the signal $\Delta\omega_R$ but is not deenergized until a significantly lower value for the signal $\Delta\omega_R$.

Referring to FIG. 1 the plot of the conduction angle in degrees for the silicon controlled rectifiers SCR of FIG. 2 versus the relative power $P_R$ is shown. The associated curve CUV indicates that the power at approximately 135° of conduction is represented by a relative power figure $P_R$ of 0.8 whereas the power at approximately 90° of conduction is represented by the relative power figure 0.045. Consequently, it can be seen that the steady state loss represented by the stabilizer L MOD of FIG. 2 is reduced significantly when the SCR's are operated at approximately 90° relatively to the power consumed at approximately 135° of conduction angle.

It is to be understood with respect to the embodiments of this invention that they are not limited to an L-type stabilizer exclusively, nor is the peripheral circuitry of FIG. 2; that is to say, the rotor speed $\Delta\omega_R$ may be determined from any convenient source. Furthermore, the conduction angles of 135° and 90° are not limiting in this case. It is to be understood with respect to the embodiments of FIG. 3 that the use of digital logic elements is not limiting. Nor is the hysteresis associating with the comparators 44 and 46 required, although that is desirable. It is also to be understood that the entire embodiment of FIG. 3 is non-limiting provided another convenient way can be found in which the magnitude of the oscillation signal $\Delta\omega_R$ can be utilized to switch the bias signal from one quiescent value to another.

The apparatus taught with respect to the embodiments of this invention has many advantages. One advantage lies in the fact that the maximum quiescent conduction angle (135° in the case of the preferred embodiment) provides dynamic range to the stabilizer which is useful to attenuate large subsynchronous resonance oscillations. Another advantage lies in the fact that the minimum quiescent conduction angle (represented in the preferred embodiment of the invention by 90°) reduces the steady state loss in the stabilizer by at least a factor of six. Another advantage lies in the fact that the minimum quiescent conduction angle has sufficient dynamic range to stabilize small disturbances of the type which are generally generated or produced internally to the turbogenerator system. Another advantage lies in the fact that the peak follower circuit PKF (FIG. 3) quickly responds to sudden increases in the generator speed variation signal but very slowly responds to reductions in speed variation signal. Furthermore, another advantage lies in the fact that switching from the maximum to minimum conduction angle does not of itself appreciably influence the generator speed variation.

What we claim as our invention is:

1. A compensator of the type which is connected to an alternating current electrical system in which it is desired to regulate system current regardless of a propensity for said system current to become unregulated in response to a deregulating stimulus, said compensator conducting any one of a plurality of controllable AC bias compensating currents for said electrical system, where controllable variation of compensating current about said AC bias currents is provided so that the total compensating current interacts with said system current to thus maintain said system current in a regulated state, comprising:

(a) bias determining means interconnected at an input thereof with said electrical system in such a manner that the extent of said deregulating stimulus is determined, said bias determining means providing an output signal indicative of in which range said extent of deregulating stimulus is present at a particular time, said range being any one of a plurality of predetermined ranges;

(b) variation determining means interconnected at an input thereof with said electrical system in such a manner that the effect of said deregulating stimulus within any of said ranges is determined, said variation determining means providing an output signal indicative of said effect at said particular time; and (c) compensating means interconnected with said electrical system, said bias determining means, and said variation determining means for conducting said AC bias compensating current with said controllable variations as a function of said output signals from said bias determining means and said variation determining means, said bias compensating current changing as said range changes.

2. A compensator of the type which is connected to an alternating current electrical system in which it is desired to compensate for the effect of superimposed oscillation in said system by conducting electrical current between the lines of said electrical system, said latter current including an AC bias current, said compensation taking the form of a controlled deviation of said electrical current about said AC bias current, said AC bias current being one of a plurality of selectable AC bias currents the magnitude of which is dependent upon the extent of said oscillation, comprising:

(a) sensing means which cooperates with said electrical system for sensing said oscillation and for providing an output signal related thereto;

(b) bias means interconnected with said sensing means for providing a first bias output signal related to oscillations of relatively low value and a second bias output signal related to oscillations of a higher value; and (c) controllable compensating means connected to said alternating current system for conducting said current, said compensating means also being connected to said sensing means to receive said output signal thereof and also being connected to said bias means to receive any of said output signals thereof, said compensating means conducting AC bias current of a first magnitude about which said deviation occurs when said first bias signal is provided and conducting AC bias current of a second magnitude about which said deviation occurs when said second bias signal is provided.

3. The combination as claimed in claim 2 wherein said first magnitude is smaller than said second magnitude.

* * * * *